United States Patent [19]

Gauthier et al.

[11] Patent Number: 5,210,747
[45] Date of Patent: May 11, 1993

[54] COMMUNICATIONS CONTROLLER FOR USE WITH A COMPUTER AND A PLURALITY OF ISDN TERMINALS

[75] Inventors: Bernard Gauthier, Montesson; Marc Lebreton, Le Port-Marly; Remy Le Gallo, Le Chesnay, all of France

[73] Assignee: Bull S.A., Paris, France

[21] Appl. No.: 741,765

[22] Filed: Aug. 7, 1991

[30] Foreign Application Priority Data

Aug. 9, 1990 [FR] France .................. 90 10179

[51] Int. Cl.⁵ .................................. H04J 3/02
[52] U.S. Cl. ................................ 370/85.1; 370/85.7
[58] Field of Search .................. 370/85.1, 77, 79, 112, 370/110.1, 94.1, 85.7

[56] References Cited

U.S. PATENT DOCUMENTS

| | | | |
|---|---|---|---|
| 4,160,877 | 7/1979 | Vander Mey | 370/112 |
| 4,325,119 | 4/1982 | Grandmaison et al. | 364/200 |
| 4,509,113 | 4/1985 | Heath | 364/200 |
| 4,623,997 | 11/1986 | Tulpule | 370/100.1 |
| 4,642,755 | 2/1987 | Hinch | 364/200 |
| 4,675,865 | 6/1987 | DeVries et al. | 370/85.1 |
| 4,700,340 | 10/1987 | Beranek et al. | 370/16 |
| 4,912,703 | 3/1990 | Sumida | 370/95.1 |
| 4,977,558 | 12/1990 | Iguchi et al. | 370/112 |
| 5,001,704 | 3/1991 | Narup et al. | 370/85.1 |
| 5,111,452 | 5/1992 | Kyumu | 370/85.1 |

FOREIGN PATENT DOCUMENTS 0289248 11/1988 European Pat. Off. .

Primary Examiner—Douglas W. Olms
Assistant Examiner—Ajit Patel
Attorney, Agent, or Firm—Weingarten, Schurgin, Gagnebin & Hayes

[57] ABSTRACT

A communications controller is provided that allows transfer of a large number of frames to each of the channels of an $S_0$-type link to be handled simultaneously at a data transfer rate matched to that of the link. The communications controller is connected between a bus associated with at least one host computer and the terminals of a network connected by a time-multiplexed digital link. The communications controller includes a base unit connected to the bus for managing and effecting the transfer of frames for the link, and a peripheral unit connected to the base unit and to the network. The base unit has a first processor of commands for transferring frames from the host to the network and vice versa, the first processor being associated with a frame storage memory; a peripheral part comprising a coupler controlled by second processor for ensuring multiplexing or demultiplexing of the data; and a second processor, in communication with the first, for transferring frames from the frame storage memory to the peripheral part and vice versa.

10 Claims, 7 Drawing Sheets

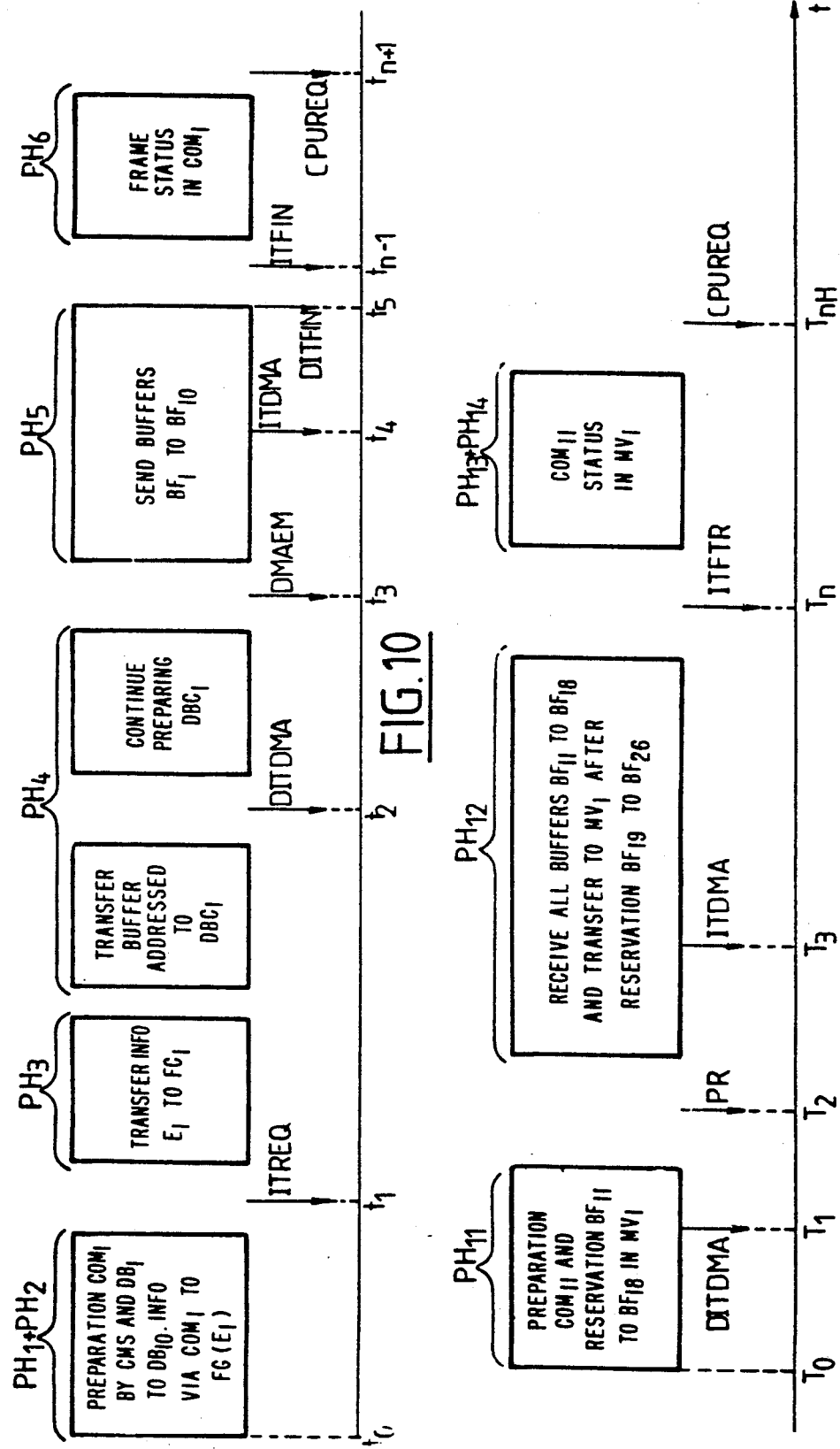

COMMUNICATIONS CONTROLLER FOR USE WITH A COMPUTER AND A PLURALITY OF ISDN TERMINALS

FIELD OF THE INVENTION

The present invention relates to communications controllers, and particularly to a communications controller for use with an ISDN (integrated services digital network).

BACKGROUND OF THE INVENTION

Data transmission networks, also called telecommunications networks or communications networks, typically include a plurality of units, generally called data terminal equipment (DTE). The latter are also referred to as terminals or stations. A computer connected to such a network is considered to be a terminal. Terminals communicate with each other via a transmission line. An $S_0$-type link, which is defined by Recommendation X431 of the CCITT (Consultative Committee on International Telegraphy and Telephony) is a transmission line that includes two pairs of telephone wires, one being dedicated to sending messages and the other being dedicated to receiving messages.

The various terminals of a network send information messages and receive those sent by others. A message is composed of a set of elementary blocks of binary information called frames. Each frame includes a structured array of data including data which defines its beginning and its end, the address of the intended receiving terminal, the address of the sending terminal, the data length, and other useful information.

A current technological trend in the field of data transmission networks is the digital transmission of both voice and data over a common infrastructure. This is due essentially to the progressive introduction of digital techniques into the field of telephony. The integrated service digital network (ISDN) has been introduced in response to this trend.

The ISDN is now used principally in Europe and more particularly in France. A communications link of the $S_0$-type, also called an $S_0$ interface, is one of the standardized links within ISDN. It is used in particular for communications between computers and terminals.

An $LS_0$ link of this type has a data transfer rate of 288 kbps (144 kbps in each direction, send and receive) and has three separate channels, namely two B-type channels for transmitting data at a rate of 64 kbps and one D-type signalling channel at 16 kbps. The principle of the $LS_0$ link is time-multiplexing, as defined in the aforementioned Recommendation X431.

A computer typically includes at least one processing unit, an input/output processor, a random access memory, and a read only memory associated with the processor, an input/output controller, all of these elements forming a host system. There are commonly several peripherals cooperative with the host system, such as disk memories or input/output peripherals that facilitate communication of data with a user (such as screen terminals, printers, etc.), each of these peripherals being associated with corresponding peripheral controllers.

All the component parts listed above (aside from the peripherals) are disposed on a set of boards whose dimensions are standardized. These boards are generally connected to one bus of the parallel type which provides communications between the various processors and data transport between the various boards, as well as providing the electrical power supply thereto.

One bus commonly used in present-day practice is called MULTIBUS II, a registered trademark of the Intel Company. The architecture of such a bus is structured around a principal bus of the standardized parallel type according to IEEE 1296 Standard. This principal bus is designated PSB.

As computer networks become more common, the number of computer terminals increases accordingly. This has necessitated the development of programmed communications controllers for reducing the load on the computer's processing unit. Such controllers manage the messages sent by the various terminals to the telecommunications network to which the computer is connected, as well as managing the messages coming from terminals on the network. In current practice, such a communications controller is built around a microprocessor connected to one or more memories, which has a basic program (simpler than that of the central processing unit) containing specialized modules allowing the bus common to the various component elements of the computer and the network transmission line to be managed, and having facilities for constituting message queues (in the memory associated with the microprocessor). This program must also allow a large number of processes to be executed simultaneously and for this purpose must rapidly generate numerous interrupts, which involves high performance mechanisms for changing the microprocessor context, as well as multiple interrupt levels. Such a program, which can be called communications software, is for example the program called CNS used in the products in the Bull S.A. Company's DN-7XXX series and also in the CNS-$A_0$ and CNS-$A_1$ products in the DPS-7000 computer series made by the same company.

In the case where the computer has a MULTIBUS II type bus, the communications processor is connected to it. It is disposed on a board connected to the PSB bus through a coprocessor, for example, of the MPC 82309 type (manufactured by the Intel Company) communicating in message mode with the other functional component parts of the computer.

Since the $S_0$-type interface is still relatively new, a communications controller which both connects to a Multibus II and manages one or more of these interfaces is practically nonexistent.

SUMMARY OF THE INVENTION

A communications controller is provided for use with at least one host system associated with a bus and a plurality of terminals, connected together through an $S_0$-type link, that allows transfer of a large number of frames to each of the channels of the link to be handled simultaneously at a data transfer rate matched to that of the link. The communications controller is connected between a bus with at least one host system and a plurality of terminals of at least one network ($RE_1$-$RE_2$) connected together through at least one time-multiplexed digital link comprising a plurality n of data channels managed according to protocols determined and supported by at least one transmission line. The communications controller includes: a base unit connected to the bus, which manages and effects the transfer of frames over all the channels in the link; and a peripheral unit connected to the base unit and to the transmission line, for providing time-multiplexing and demultiplexing of the various data channels, and for transmitting data to the network or receiving data from the network. The base unit includes: a first processor for frame transfer commands to transfer the frames from the host to the network and vice versa, the processor being connected to the bus and associated with a first memory for storing the frames before their transfer, and managing the transfer of frames to the various channels assigned thereto; and a second processor in communication with the first, for transferring each of the frames, channel by channel, from the first memory to the peripheral part, then the network, and vice versa, the peripheral part having a coupler for all the channels controlled by the second processor, connected to the transmission line and receiving the data from each frame, buffer by buffer, coming from or going to the first memory, providing multiplexing or demultiplexing of the data upon sending or upon receiving.

DESCRIPTION OF THE DRAWING

The invention will be more fully understood from the following detailed description, in conjunction with the accompanying figures, in which:

FIG. 10 is a time chart illustrating the various successive operations carried out by the communications controller according to the invention when frames are sent; and FIG. 11 is a time chart illustrating the various successive operations carried out by the communications controller according to the invention when frames are received.

DETAILED DESCRIPTION OF THE INVENTION

Figure 1:
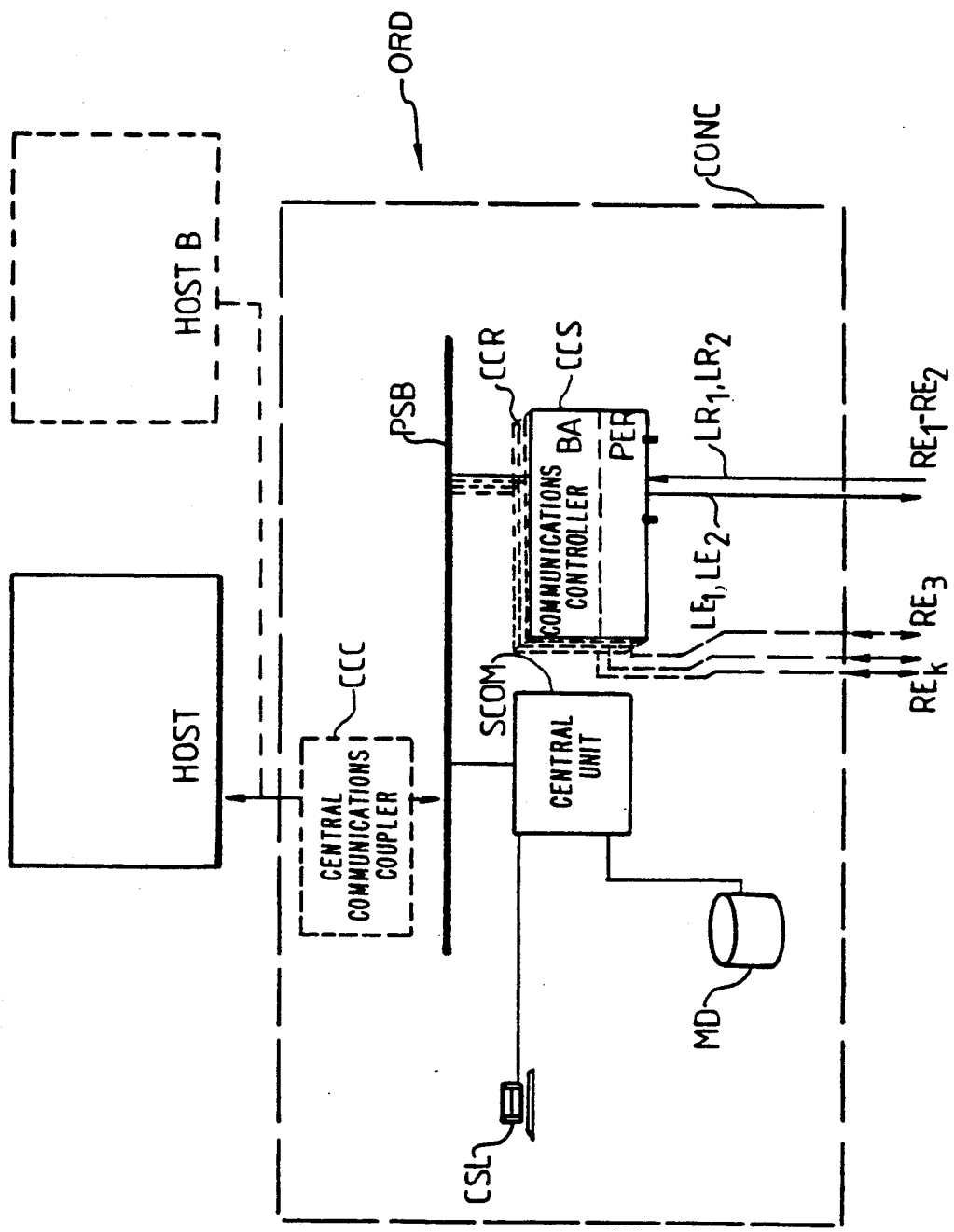
FIG. 1 is a highly simplified block diagram of a computer having the communications controller according to the invention.

With reference to FIG. 1, a data processing system ORD is connected to a set of k networks of different types, $RE_1$, $RE_2$, ..., $RE_k$ by a plurality of k links of different types. The structure of the system ORD is deliberately simplified and includes: the host system HOST constituting its central system; and a network link concentrator CONC managing and effecting the transfer of frames from the host to these networks $RE_1$, $RE_2$, ..., $RE_k$ and vice versa. This concentrator CONC is also called the network line concentrator. It should be noted that the concentrator CONC can also connect other hosts than HOST to networks $RE_1$ to $RE_k$, for example to host HOSTB shown in dashed lines in FIG. 1.

The concentrator CONC includes: a central unit SCOM which administers and manages the concentrator CONC. In particular, it loads all the programs and microprograms associated with each of the boards constituting the concentrator CONC into this unit when they are initialized; a bus PSB, preferably of the Multibus II type; a communications controller assembly CCR allowing the concentrator CONC (and hence HOST) to be connected to the various networks $RE_k$. It comprises the communications controller CCS according to the invention allowing it to be connected, in the embodiment described here, to two ISDN networks $RE_1$-$RE_2$ each using an $S_0$ type communications link.

Concentrator CONC is here considered a terminal of the two networks $RE_1$-$RE_2$, communicating with the other terminals of the two networks $RE_1$-$RE_2$.

The host can be connected either directly to bus PSB through a coprocessor MPC 82309, or through a central communications coupler CCC, particularly in the case where several hosts are connected to the concentrator CONC (CCC is shown in dashed lines in FIG. 1).

The frames coming from the host HOST intended for networks $RE_1$-$RE_2$ reach the communications controller CCS through the bus PSB. The communications controller CCS divides each of them into a plurality of data buffers, and manages and transfers this set of frames over the various data channels of the two $S_0$ type links. These data are time-multiplexed by the controller CCS. The controller CCS thus multiplexes the frames sent by host HOST for both the $S_0$ type links. From the functional standpoint, it will thus be considered in the remainder of the text that these two $S_0$ type links behave like a single link having B type channels $B_1$ and $B_2$ and D type channels $D_1$ for the first link, and B type $B_3$ and $B_4$ and D type $D_2$ for the second. To simplify, channels $B_1$, $B_2$, $D_1$, $B_3$, $B_4$, and $D_2$ will hereinafter be designated $C_1$ through $C_6$, respectively.

Figure 2:
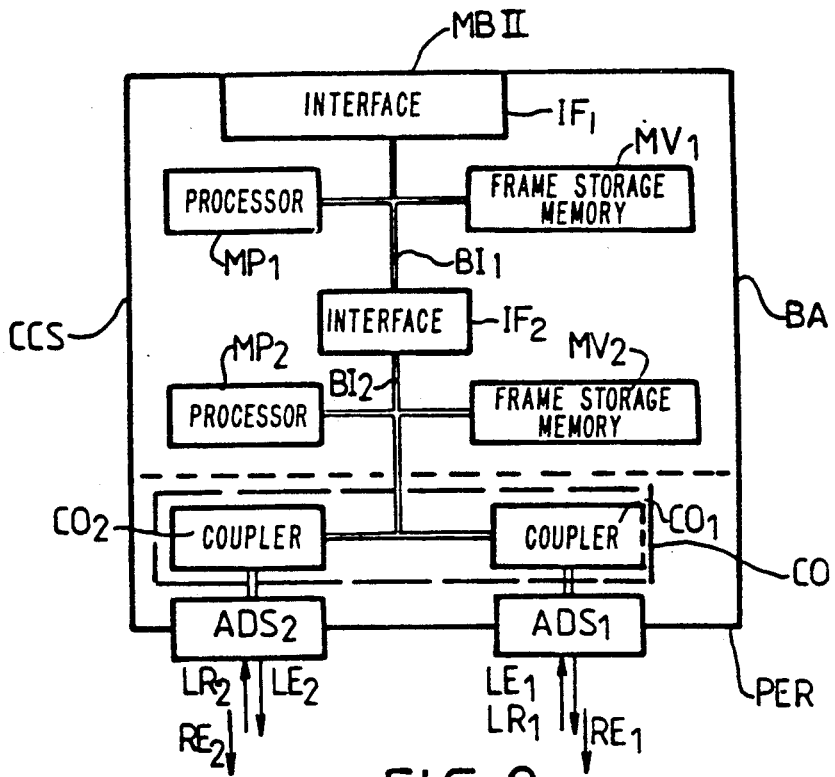
FIG. 2 is a block diagram of the physical structure of the communication controller according to the invention.
Figure 3:
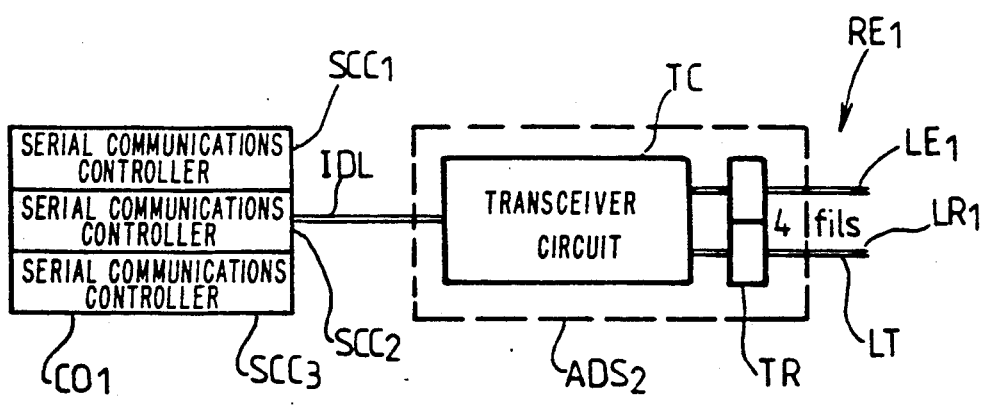
FIG. 3 is a block diagram of the peripheral part of the communications controller according to the invention.

With reference to FIGS. 2 and 3, the communications controller CCS according to the invention comprises a base unit BA and a peripheral unit PER as can be seen in FIG. 2.

Base unit BA includes:

an interface $IF_1$ with bus PSB, of the Multibus II type, defined by IEEE Standard P 1296, for example composed of MPC 82309 (see above);

a first microprocessor $MP_1$ of the 68030 type made by the Motorola Company, associated with a first random access memory $MV_1$ with a four megabyte capacity;

a second microprocessor $MP_2$ associated with a second random access memory $MV_2$ with 512 kilobytes of memory, operating in the master mode; and an interface $IF_2$ allowing a dialogue between first and second microprocessors $MP_1$ and $MP_2$, allowing physical matching of the signals transiting through internal bus $BI_1$ of first microprocessor $MP_1$ with those transiting through internal bus $BI_2$ of second microprocessor $MP_2$.

Peripheral unit PER includes:

a coupler CO controlled by second microprocessor $MP_2$ of base unit BA; and a first and a second physical connection device to first network $RE_1$ and second network $RE_2$, respectively, namely $ADS_1$ and $ADS_2$.

Coupler CO is in fact composed of two identical couplers $CO_1$ and $CO_2$ which, in the embodiment of the communications controller according to the invention, are formed by three serial communications controllers each belonging to the peripheral part of a 68302 microcontroller made by the Motorola Company. (It is known that a 68302 microcontroller is in fact formed by the combination of a 68000 microprocessor and a peripheral part formed of serial communications controllers). Thus, controller $CO_2$ is formed by the three serial communications controllers $SCC_4$, $SCC_5$, $SCC_6$ (see also FIG. 3) of a 68302 microcontroller whose 68000 microprocessor is none other than $MP_2$, while controller $CO_1$ constitutes the peripheral part formed of three serial communications controllers $SCC_1$, $SCC_2$, $SCC_3$ of a second 68302 microcontroller whose 68000 microprocessor is not used.

As can be seen from FIG. 3, coupler $CO_1$ is connected to network $RE_1$, namely to telephone lines $LE_1$ and $LR_1$ through physical connection device $ADS_2$ formed by transceiver circuit TC and transformer TR. The $S_0$ type transceiver is a circuit of the MC145474 type made by Motorola.

Coupler $CO_1$ is connected to transceiver TC via an interface known as IDL (interchip data link).

An outline of the operation of the communications controller CCS is as follows:

First processor $MP_1$ controls the transfer of the frames sent by the host HOST intended for either of networks $RE_1$ or $RE_2$; thus, it receives the frames from bus PSB and stores them in its random access memory $MV_1$ while they are being actually transferred to either of the two aforesaid networks. Conversely, it receives in its random access memory $MV_1$ the frames coming from either of these two networks before sending them via bus PSB to the host HOST. The first processor divides each of the frames into a plurality of buffers such as $BF_1$, $BF_2$, ..., $BF_n$. $MP_1$ assigns a totally random physical location to each of them in random access memory $MV_1$. As soon as one of data channels $C_1$ to $C_6$ (see above) is available, the first processor asks the second processor $MP_2$ to transfer the frame in question from the random access memory $MV_1$ to the coupler $CO_1$ and then to the network $RE_1$ or $RE_z$ through the internal buses $BI_1$, $BI_2$ and the interface $IF_2$ in the appropriate channel, for example $C_1$. It is clear that the first processor $MP_1$ proceeds in the same way with each of the frames, for each of the channels $C_1$ to $C_6$. In other words, the first processor $MP_1$ manages transfer of each of the frames it receives from the PSB or from one of the two networks $RE_1$-$RE_2$ through the various channels $C_1$ to $C_6$ assigned to each one, for both sending and receiving. It is clear that, in receiving, physical locations in $MV_1$ are assigned, also randomly by $MP_1$, to the various buffers $BF_{11}$, $BF_{12}$, ..., $BF_m$ of each frame, these locations being different from those assigned to $BF_1$... $BF_n$. When sending, second processor $MP_2$, having received the transfer request from the first processor $MP_1$, transfers the frame in question, buffer by buffer, over the channel assigned to this frame, from the first memory $MV_1$ to the peripheral part PER.

When receiving, $MP_2$ transfers the frame coming from one of the two networks $RE_1$-$RE_2$ in the appropriate channel, buffer by buffer, from the peripheral part to $MV_1$.

The peripheral part PER, for example via first coupler $CO_1$, looks for the buffers of the frame in question in $MV_1$ and transfers them to network $RE_1$ or $RE_2$ through the serial communications controller $SCC_1$ associated with the channel assigned to the frame sent. When receiving, $MP_2$ transfers, buffer by buffer, in the appropriate channel, from the peripheral part to $MV_1$. In the preferred embodiment of the invention described here, serial communications controller $SCC_1$ can manage a maximum of 8 buffers simultaneously both when sending and when receiving. This controller receives the buffers in parallel if they are coming from memory $MV_1$ or serially if they are coming from network $RE_1$--$RE_2$. It serializes or deserializes them as the case may be. Coupler $CO_1$ multiplexes or demultiplexes the data received by the various serial communications controllers $SCC_1$ to $SCC_6$. In fact, coupler $CO_1$ can receive several frames simultaneously at each of its controllers, or more precisely several sets of buffers corresponding to several frames.

First and second processors $MP_1$ and $MP_2$ carry out their work on instructions from a communications program CNS (see above) and a microprogram AML, respectively.

When communications controller CCS is switched on, communications program CNS and microprogram AML which are stored in disk memories MD of concentrator CONC, are loaded into each of random access memories $MV_1$ and $MV_2$, respectively. This loading is done through bus PSB. Of course, this loading takes place once the board corresponding to communications controller CCS has been initialized. This initialization is done under the control of a microprogram stored in a PROM-type programmable memory installed in base unit BA and not shown in FIG. 1 or FIG. 2 for simplicity's sake.

The communications software is in fact the operating system of communications controller CCS. This software organizes the link between host HOST and microprogram AML which is more specifically responsible for transferring each of the frames to channels $C_1$ to $C_6$.

Figure 4:
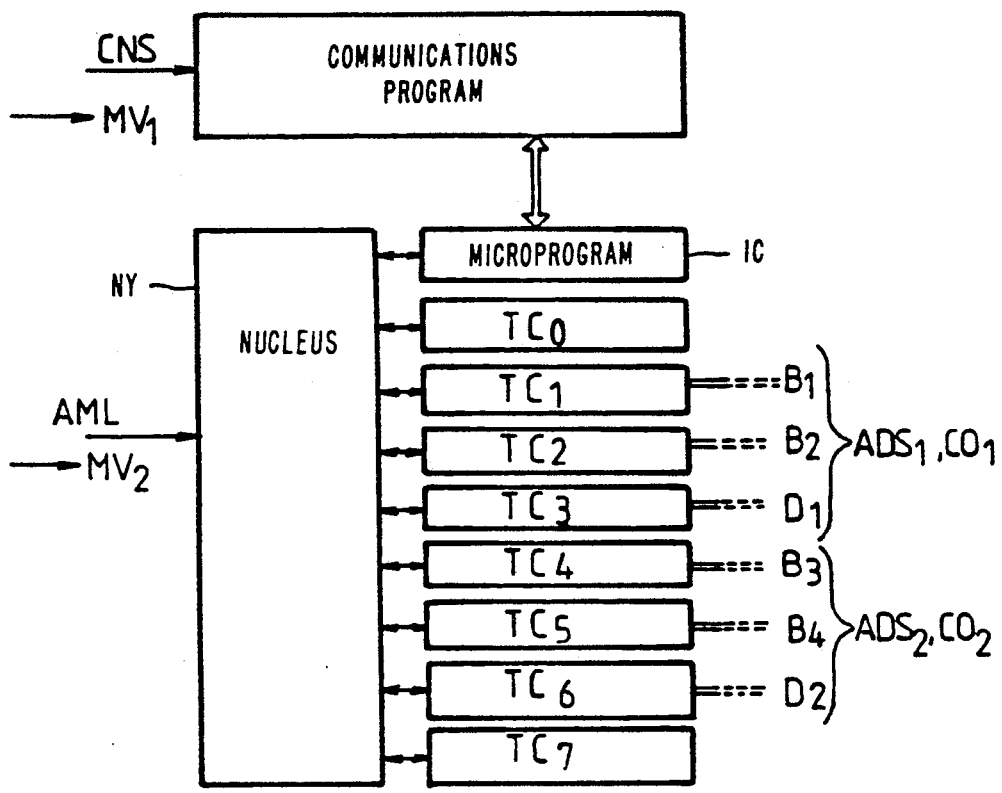
FIG. 4 is a block diagram of the structure of the program and microprogram assembly of the communications controller according to the invention.

We will now consider FIG. 4 which shows very schematically the links between the communications program CNS and the microprogram AML.

The microprogram AML has a nucleus NY, a communications interface IC for dialogues between communications program CNS and microprogram AML, as well as a plurality of microprogram modules, also called tasks, namely $TC_0$, $TC_1$, $TC_2$, ..., $TC_7$. Microprogram modules $TC_1$ through $TC_6$ each correspond to channels $C_1$ through $C_6$ defined above. They are thus responsible for transferring the frames assigned to each of these channels from memory $MV_1$ to peripheral part PER and vice versa. Tasks $TC_0$ and $TC_7$ are specific to the board containing controller CCS. Thus, task $TC_7$ serves to configure ISDN channels $C_1$ to $C_6$. This means that instead of, for example, using each of the two 64 kbps channels $C_1$ and $C_2$ handled respectively by $SCC_1$ and $SCC_2$, it may be desirable to use only one 128 kbps channel $C_1 + C_2$ handled by the controller $SCC_1$ alone, $BCC_2$ then being inactive. $TC_7$ is thus responsible for implementing such a configuration if necessary. The role of $TC_6$ will be explained below.

Each task corresponding to a channel is a task independent of the others. The sequence of tasks is organized in real time by nucleus NY.

Microprogram AML, which receives its commands from the communications software installed in memory $MV_1$, is seen by this software as a set of 8 independent tasks. Nonetheless, tasks $TC_0$ to $TC_7$ can function simultaneously under the command of the nucleus NY. Each of these tasks hence has direct links with the nucleus NY but none with the others.

The microprogram module IC manages the interface with program CNS. It deals with the requests coming from the latter and switches them to the various tasks corresponding to the various channels so that they can be executed. Symmetrically, it is responsible for transferring states or data coming from the channels corresponding to each of the tasks intended for the CNS program.

Exchanges between base unit BA and peripheral unit PER are defined by command descriptors. A command descriptor corresponds to a given frame and defines the operations that must be accomplished on this frame (see below).

The command descriptors occupy, in memory $MV_1$, random locations determined by communications program CNS. The physical addresses of these locations and the corresponding locations themselves are not released until the frames associated with these command descriptors have been released (have been sent in full in the case of a send or received in full in case of a receive). Thus, a command descriptor COM1 corresponds to a frame $TR_1$ (see FIG. 6), a command descriptor corresponds to a frame $TR_2$, a command descriptor $COM_3$ corresponds to a frame $TR_3$, etc.

For a given channel $C_1$ to $C_6$, the command descriptors are chained through chaining pointers. In other words, command descriptor $COM_1$ is chained to descriptor $COM_2$ by a chaining pointer $PC_1$, command descriptor $COM_2$ is chained to command descriptor $COM_3$ by a chaining pointer $PC_2$. A chaining pointer is none other than the logic address occupied by the command descriptor following the descriptor containing the chaining pointer. Thus, chaining pointer $PC_1$ indicates the logic address of command descriptor $COM_2$ and chaining pointer $PC_2$ indicates the logic address of command descriptor $COM_3$, etc.

It is known that a frame is composed of a plurality of data packets or buffers. In the embodiment described here, each buffer has a maximum of 200 8-bit bytes. For example, frame $TR_1$ has (see also FIG. 6) buffers $BF_1$, $BF_2$, ..., $BF_n$. Likewise, frame $TR_1$ is composed of buffers $BF_{11}$ to $BF_m$. Each buffer is associated with a specific physical location in memory defined by a buffer descriptor. Thus, buffer descriptors $DB_1$ to $DB_n$ correspond to buffers $BF_1$ to $BF_n$. Likewise, buffer descriptors $DB_{11}$ to $DB_m$ correspond to buffers $BF_{11}$ to $BF_m$. Of course, the buffer descriptors occupy different physical locations in the memory $MV_1$ where they are located than the buffers with which they are associated. Thus, $DB_1$ occupies a different location in memory than buffer $BF_1$, etc.

Moreover, by misuse of language, the individual skilled in the art assigns the same name to the buffers as to the physical locations assigned to them in memory $MV_1$. Thus, for example, $BF_1$ designates both a buffer or data packet and the physical location where it is stored in memory $MV_1$. Container and content thus have the same designation, and this applies also to the command descriptors and buffer descriptors.

Each command descriptor has a pointer to the descriptor of the first physical buffer corresponding to the first data packet of the frame. Thus, command descriptor $COM_1$ contains pointer $PB_1$ defining the address of buffer descriptor $DB_1$, namely the address of the physical location occupied by this descriptor in memory $MV_1$. Likewise, command descriptor $COM_2$ contains pointer $PB_2$ defining the physical location of buffer descriptor $DB_{11}$.

Each buffer descriptor contains a pointer to the following buffer descriptor. Thus, buffer descriptor DB1 contains pointer $PCB_1$ defining the address, i.e., the physical location occupied by buffer descriptor $DB_2$. This pointer is designated $PCB_1$.

In conclusion, a command descriptor such as $COM_1$ to $COM_3$, includes:

a chaining pointer to another command descriptor such as $PC_1$, $PC_2$, etc. This pointer is adapted to be used by communications interface IC and is at the head of the descriptor;

a pointer to the descriptor of the first physical buffer, such as $PB_1$, $PB_2$, etc.;

a total byte count of the useful data in the physical buffer chain, in other words the total number of bytes contained in the frame formed by buffer chain $BF_1$, $BF_2$ to $BF_n$, or $BF_{11}$ to $BF_m$, etc.;

an index indicating the actual start of the data in the first physical buffer, i.e. for example the physical address of the beginning of the data in first physical buffer $BF_1$ in memory $MV_1$;

an indicator showing whether the command is an immediate command. The immediate commands are commands that do not involve the use of data packets designed to be transferred to the network or coming therefrom. These immediate commands can for example be a command to activate a channel with a view to receiving or a command to deactivate this same channel on reception, as soon as a frame has been fully received and transmitted to the CPU;

a status field indicating the result of executing the command, i.e. whether or not the command has been correctly executed; and a command bit field including the command code; there are several types of commands which will be defined below, to which a particular code corresponds.

Other than the immediate commands (channel activation on reception and channel deactivation) defined above, there are two other types of commands, namely a data send command and a purge command relative to data sending when, for some reason or another, sending over a channel must be stopped. This purge command is an immediate command.

The format of the command descriptors is defined when the board carrying communications controller CCS is initialized and is defined by task $TC_0$, namely the microprogram module corresponding to channel $C_0$. Once this format has been defined upon initialization of communications controller CCS, the command descriptor format is immutable.

The format of the buffer descriptors such as $DB_1$ to $DB_n$ or $DB_{11}$ to $DB_m$ is defined by communications program CNS. It includes:

a chaining pointer to the next buffer descriptor, for example, chaining pointer $PCB_1$. This pointer is a logic address that defines the memory location of the corresponding buffer descriptor, namely $DB_2$; and a start index defining the physical location occupied in memory by the start of buffer $BF_1$. Likewise, buffer descriptor $DB_2$ contains a start index defining the start of the physical location occupied in memory by buffer $BF_2$.

A start index is obtained as follows:

The address defining the physical location occupied in memory $MV_1$ by buffer $BF_2$, for example, (the same reasoning applies to the other buffers), which can also be defined as the physical address of buffer $BF_2$, is obtained by adding to the logical address defined by pointer $PBF_2$ of this same buffer contained in the associated descriptor $DB_2$, a logical magnitude $\Delta_1$. Thus, if $I_2$ is the start index of $BF_2$, one can write $I_2 = PBF_2 + \Delta_1$:

the index defining the end of the physical location occupied by the corresponding physical buffer. Hence, $DB_1$ contains the index defining the physical location of the end of buffer $BF_1$;

the total size in number of bytes of the corresponding buffer. $DB_1$ thus contains the total number of data bytes contained in buffer $BF_1$.

Just as in the case of the command descriptors and the buffer descriptors, any logic address is also a physical address.

Figure 8:
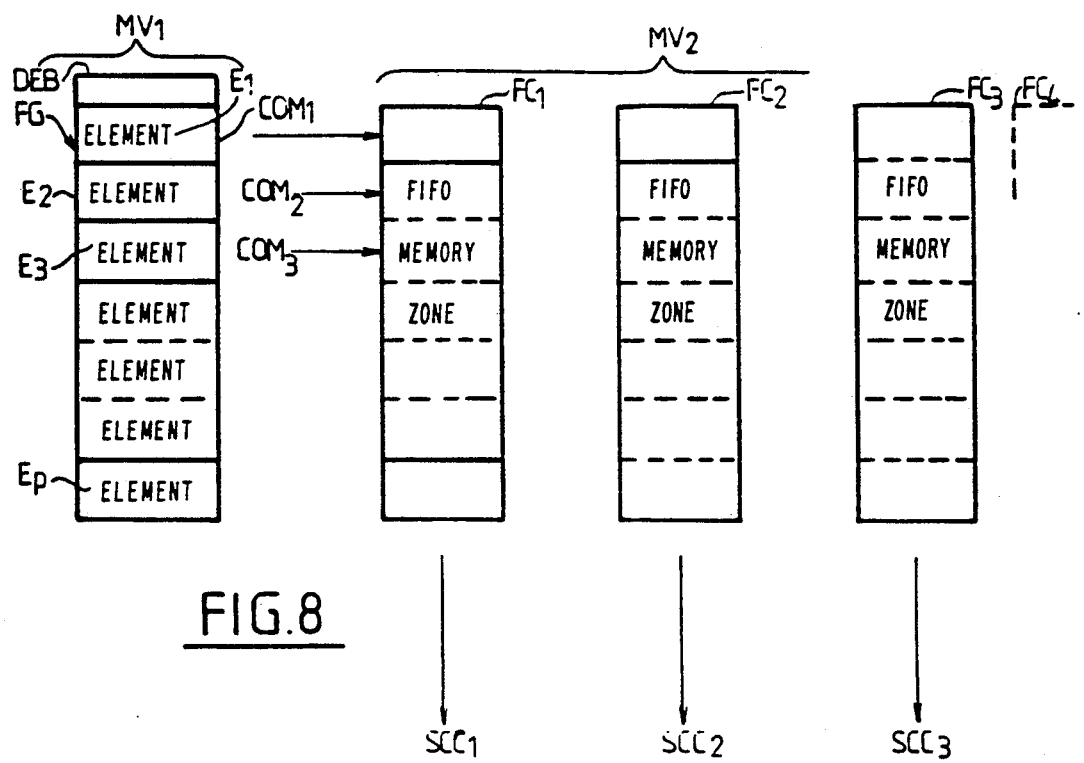
Figure 9:
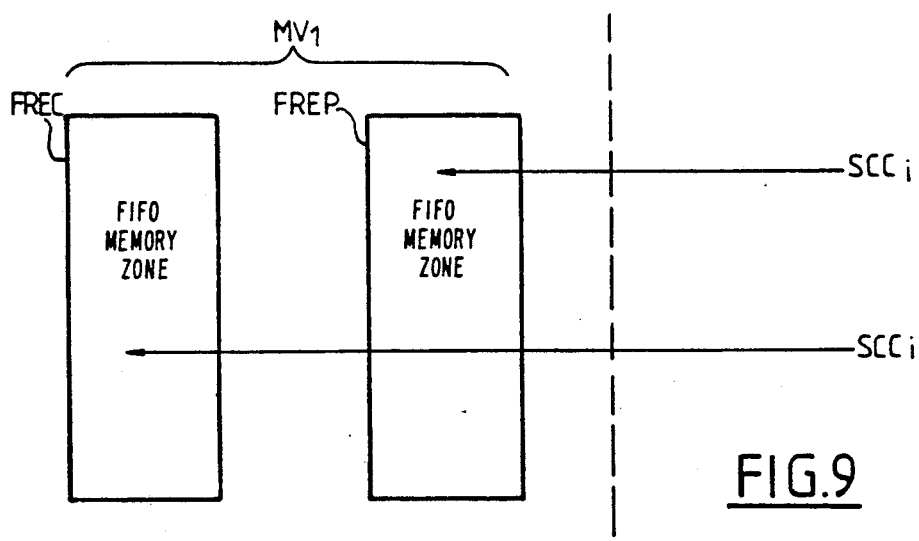

First memory $MV_1$ also contains several memory zones operating according to the FIFO memory principle. These memory zones are defined by communications program CNS. $MV_1$ in fact contains three FIFO memory zones, namely FG, FREC, and FREP. Each of these FIFO memory zones contains a certain number p of elements. Each element contains the address of a command descriptor and the channel number corresponding to the command defined by this descriptor. The CNS program, for each FIFO memory zone, thus defines the address of the start of this memory zone, the index of the head element, namely the address of the head element, the index of the tail element, namely the address of the tail element, as well as the number of elements contained in this FIFO memory zone. Thus, for example, FIFO memory zone FG contains the p elements $E_1, E_2, E_3, \ldots, E_p$ (see FIG. 8). Thus, the CNS program defines the address of the start DEB of FIFO zone FG, the index of head element $E_1$, the index of tail element $E_p$, and the number of elements p. The same obviously also applies to FIFO memory zones FREC and FREP which contain the same number of elements p. Element $E_1$ thus contains the address of command descriptor $COM_1$ as well as the channel corresponding to the command defined by this descriptor, for example channel $C_1$. Element $E_2$ contains the address of command descriptor $COM_2$ and the address of the corresponding channel, in this case $C_1$ (see above). Element $E_3$ contains the address of command descriptor $COM_3$ and the corresponding channel, namely $C_1, \ldots$, and so forth for elements $E_3$ to $E_p$.

Second memory $MV_2$ also contains, in addition to the set of microprograms defined above, a number of FIFO memory zones, equal in number to the number of data channels, namely $C_1$ to $C_6$. Hence it contains 6 FIFO memory zones, namely $FC_1, FC_2, \ldots, FC_6$ (see FIG. 8).

Each FIFO, $FC_1$ through $FC_6$, contains the addresses of the command descriptors corresponding to the associated channel as well as the number of this channel. Thus, FIFO $FC_1$ contains the address of command descriptor $COM_1$ and the channel number corresponding to this command descriptor, i.e. channel $C_1$, as well as the address of $COM_2$ and channel number $C_1$, etc.

The information contained in each of FIFOs $FC_1$ to $FC_6$, which information is defined above, is transferred thereto from FIFO memory FG of $MV_1$ under the conditions described below, in conjunction with the operation of communications controller CCS according to the invention. Moreover, the information contained in each of FIFOs $FC_1$ to $FC_6$ is transferred to serial communications controllers $SCC_1$ to $SCC_6$ under the conditions to be defined below.

Figure 5A:
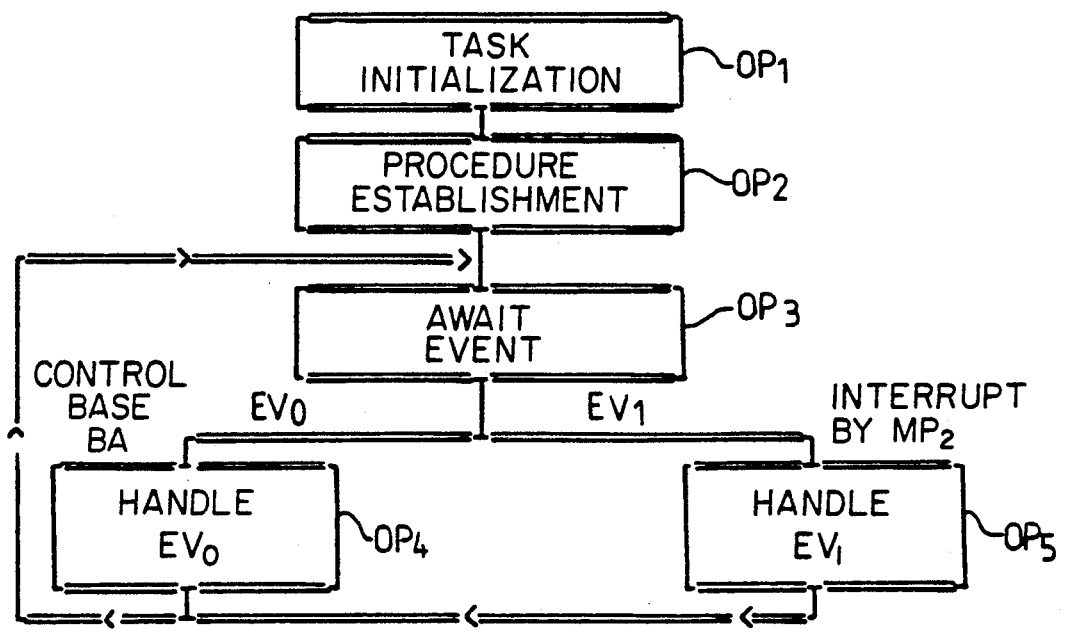
FIG. 5a is a simplified flowchart of the operation of a microprogram module assigned to one data channel of the $LS_0$ link, allowing transfer of frames over this channel.
Figure 5B:
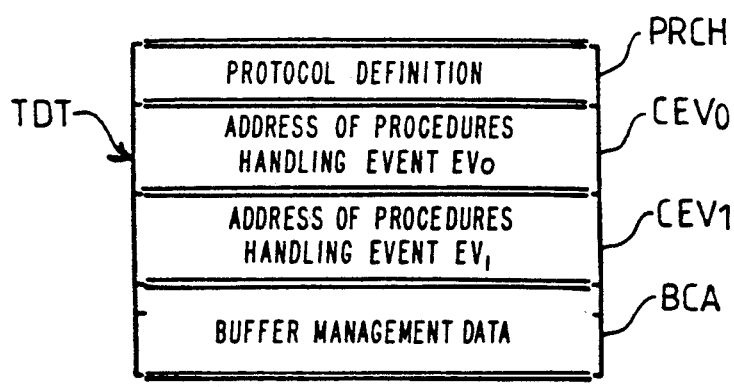
FIG. 5b is a diagram of the simplified structure of the microprogram module whose simplified flowchart is shown in FIG. 5a, FIG. 6 is a block diagram of the mechanism whereby the program and each of the microprograms assigned to each of the channels communicate with each other.
Figure 6:
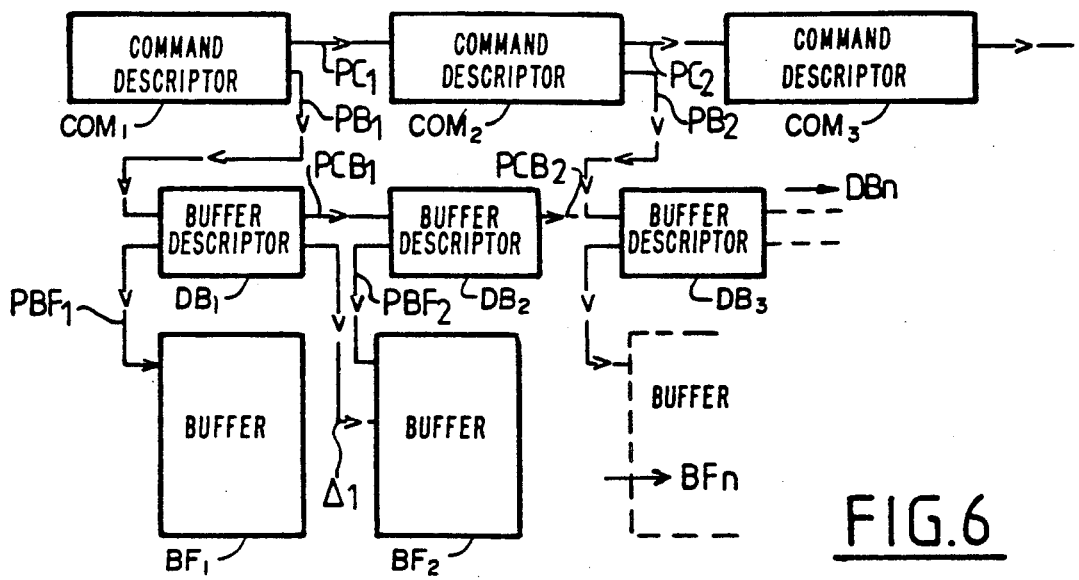
Figure 7:
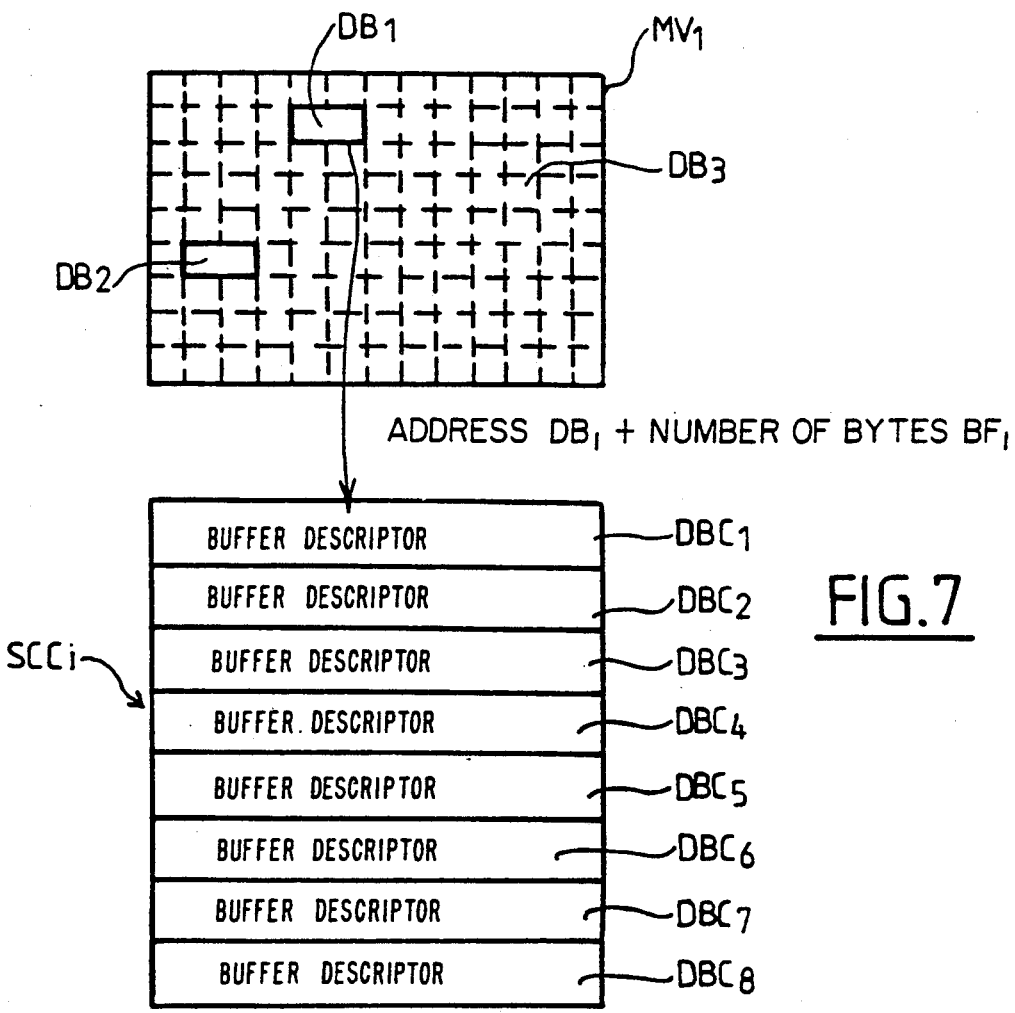
FIGS. 7, 8, and 9 are memory map diagrams that illustrate the operation of the communications controller according to the invention when frames are sent or received, i.e. when frames are sent from the computer to the network using the $LS_0$ communications link and vice versa.

With reference to FIGS. 5 and 6, FIG. 5 is a simplified flowchart of operations $OP_1$ through $OP_5$ implemented when each of tasks $TC_1$ to TC is executed. Operation $OP_1$ is an operation initializing the task effected by nucleus NY. Operation $OP_2$ which follows operation $OP_1$ allows each of the procedures that can be implemented by task $TC_1$ ($TC_1$ to $TC_6$) to be established, i.e. either a frame send procedure or a frame receive procedure or a procedure to activate or deactivate the corresponding channel. In this operation, the task will look for the addresses of the procedures for handling either the CNS program commands upon a send request or the addresses of the procedures handling the actions triggered by a processor $MP_1$ interrupt, when it is necessary to receive a frame from network $RE_1$-$RE_2$.

Upon operation $OP_3$, the task waits for an event. This event can be either a CNS program command, for example when the program wants to send a frame to the network, or a microprocessor $MP_2$ interrupt for reception of a frame from the network. In the first case (CNS program command) one is dealing with event $EV_0$. In the second case, one is dealing with event EV1 The way in which events EVe or EV1 occur is shown in detail below in the description associated with FIGS. 6, 7, 8, 9, 10, and 11.

Once either of operations $OP_4$ or $OP_5$ is terminated, operation $OP_3$ is returned to.

Memory $MV_2$ also contains a description table TDT describing each task $TC_1$ to $TC_6$. This description table is created dynamically each time one of tasks $TC_1$ to $TC_6$ is launched, i.e. it is established whenever nucleus NY calls on one of tasks $TC_1$ to $TC_6$ TDT includes the following four major parts:

Part PRCH: this part defines the protocol used on the channel. It will be remembered that a communications protocol is composed of the access rules to the various terminals in a network, which rules govern dialogues between the terminals. A protocol sequences conversation between these terminals without hierarchizing it. Various types of protocols are known. The protocol in widest use is the HDLC protocol (high level data link control) standardized according to CCICC Recommendation X25, Yellow Book, Vol. XIII.2, November 80 and according to international standards defined by the International Standardization Organization (ISO) under the following designations: IS3309-2, IS4335, IS6159 and 6258. This HDLC protocol is more specifically used in networks $RE_1$ and $RE_2$.

Part $CEV_0$: this part contains the addresses of the procedures handling event $EV_0$. It is created when procedure-establishing operation $OP_2$ occurs.

Part $CEV_1$: this part contains the addresses of the procedures handling event $EV_1$. It is created when operation $OP_2$ occurs.

Part PCA: this part contains the information necessary for task $TC_1$ for managing the buffers in a frame: it contains in particular the number of buffers that each of the serial communications controllers can send without interruption—eight in the embodiment described here.

Each serial communications controller $SCC_1$ to $SCC_6$ has buffer descriptors in the same number as the maximum number of buffers that can be sent without interruption, namely eight. Thus, serial communications controller $SCC_1$ has buffer descriptors $DBC_1$, $DBC_2$ to $DBC_8$. The same applies to the other serial communications controllers $SCC_2$ to $SCC_6$.

Each of buffer descriptors $DBC_1$ to $DBC_8$ has the addresses of the buffer descriptors contained in $MV_1$ corresponding to the command descriptor which is handled by the task of the corresponding channel, namely $TC_1$. Buffer descriptor $DBC_1$ thus contains the address of the buffer descriptor $DB_1$ corresponding to command descriptor $COM_1$, whose command is executed by task $TC_1$ associated with channel $C_1$. Moreover, the first command descriptor of serial communications controller $SCC_2$ contains the address of the first buffer descriptor corresponding to the command descriptor whose command is handled by the task $TC_2$ corresponding to channel $C_2$.

Each of the buffer descriptors of the various serial communications controllers also contains the number of bytes in the corresponding buffer. Thus, buffer descriptor $DBC_1$ contains the number of information bytes contained in buffer $BF_1$.

The data contained in each buffer of memory $MV_1$ are transmitted, with each send, over line $LE_1$ (or $LE_2$) under the control of $SCC_1$ for channel $C_1$, $SCC_2$ for $C_2$, etc.

The functioning of communications controller CCS will be better understood in the light of the explanations furnished below in relation to FIGS. 6 through 11.

We will thus consider an event $EV_0$ and assume that it is desired to send from CCS a frame $TR_1$ composed of 10 buffers $BF_1$ to $BF_{10}$, and that this frame is sent by communications controller $C_1$, thanks to task $TC_1$. Sending of the frame includes the following successive phases:

First Phase $PH_1$

First processor $MP_1$ prepares, under the instructions of communications program CNS, starting at time $t_0$ (FIG. 10), command descriptor $COM_1$. The information contained in this command descriptor will occupy in memory $MV_1$ a physical location prepared for the purpose by the CNS program when the board containing communications controller according to the invention CCS is initialized. Thus, as stated above, to this command descriptor $COM_1$ there corresponds a plurality of buffer descriptors $DB_1$ to $DB1e$ to which buffers $BF_1$ to $BF_{10}$ correspond. The buffer descriptors are thus prepared by first processor $MP_1$. (The physical locations reserved for the buffer descriptors are prepared in the same way as the physical locations of the command descriptions when CCS is initialized.) Moreover, the bytes corresponding to the ten buffers in frame $TR_1$ are stored in each of the physical locations corresponding to buffers $BF_1$ to $BF_{10}$. As soon as buffer descriptors $DB_1$ to $DB_{10}$ corresponding to command descriptor $COM_1$ are prepared, phase $PH_2$ ensues.

Phase $PH_2$

The CNS program puts into FIFO FG, in first element $E_1$, the address of command descriptor $COM_1$ as well as the corresponding channel number, in this case the number of channel $C_1$, namely one, for example. Once element $E_1$ is filled with this information, first processor MP sends an interrupt ITREQ to second processor $MP_2$, at time $t_1$. As far as the sending of frame $TR_1$ is concerned, communications program CNS has finished its job for the time being. Phase $PH_3$ then ensues.

Phase $PH_3$

In this phase, the instructions executed by processor $MP_2$ are those of communications interface IC. As soon as interrupt ITREQ has been received by $MP_2$, microprocessor $MP_2$ transfers the information contained in element $E_1$ of FIFO FG to FIFO $FC_1$. It is clear that the information contained in FIFO FG of $MV_1$ corresponding to command descriptors associated with any of channels $C_1$ to $C_6$ can be transferred from FIFO FG of $MV_1$ to any of the six $MV_2$ FIFOs. Indeed, processor $MP_1$, under the control of the CNS program, can prepare several frames $TR_2$, $TR_3$, etc. simultaneously, with their associated command descriptors and buffer descriptors. Moreover, for a given channel, for example for channel $C_1$ (but it is obvious that the same applies to the others) several command descriptor addresses can be transferred simultaneously, as can the corresponding channel number in FIFO $FC_1$ corresponding to this channel $C_1$. As soon as this information has been transferred to FIFOs $FC_1$ to $FC_6$, phase $PH_4$ ensues.

Phase $PH_4$

Communications interface IC alerts corresponding task $TC_1$. The instructions will then be carried out by second processor $MP_2$, under the instructions of $TC_1$. Task $TC_1$ will look for the address of command descriptor $COM_1$ in $FC_1$, then analyze the command descriptor itself in memory $MV_1$ to examine the nature of the command, e.g., send or receive, or immediate or nonimmediate command. Task $TC_1$ finds in this command descriptor the address of buffer descriptor $DB_1$, and looks in this buffer descriptor for the address of corresponding buffer $BF_1$. It then places the address of the latter in buffer descriptor $DBC_1$ of $SCC_1$ It also places there the number of bytes corresponding to buffer $BF_1$, which it finds in descriptor $DB_1$. The task thus continues looking for the addresses of buffers $BF_2$ to $BF_6$ in buffer descriptors $DB_2$ to $DB_6$ and transfers this information to buffer descriptors $DBC_2$ to $DBC_6$ of $SCC_1$. When $DBC_6$ is full, task $TC_1$ makes an interrupt request DITDMA of processor $MP_1$ (this interrupt request, which takes place once the sixth buffer descriptor is full, is provided in the microprogram corresponding to this task. It is arbitrary that the interrupt request takes place after the sixth buffer descriptor is full, and so the interrupt request could also take place after the fifth buffer descriptor is full, for example. Thus, it is clear that this interrupt request could take place after any other buffer descriptor of $SCC_1$ was full).

Although interrupt request DITDMA has taken place, task $TC_1$ continues to fill $DBC_7$ and $DBC_8$. Since interrupt request DITDMA took place at time $t_2$, as soon as $DBC_8$ is full, second processor $MP_2$, under the control of $TC_1$ instructions, sends $SCC_1$ a send request DMAEM at time $t_3$. Phase $PH_5$ then ensues.

Phase $PH_5$ $SCC_1$ looks for buffers $BF_1$ to $BF_8$ in $MV_1$ and sends them to network $RE_1$–$RE_2$. When sixth buffer $BF_6$ has all been sent, the interrupt corresponding to interrupt request DITDMA is sent, and is called ITDMA. It is sent at time $t_4$. Starting at this time, while $SCC_1$ continues to send seventh and eighth buffers $BF_7$ and $BF_8$, task $TC_1$ fills buffer descriptors $DBC_1$ and $DBC_2$ of $SCC_1$ with the addresses of buffers $BF_9$ and $BF_{10}$ which it finds in buffer descriptors $DB_9$ and $DB_{10}$ and with the corresponding number of bytes. When buffer descriptor $DBC_2$ has been filled in this way, task $TC_1$ requests an end-of-frame interrupt DITFIN at time $t_5$. When last buffer $BF_{10}$ has been sent, then second processor $MP_2$ sends an end-of-send interrupt designated ITFIN, at time $t_n$. Phase $PH_6$ then ensues.

Phase $PH_6$

Immediately after end-of-send interrupt ITFIN, task $TC_1$ sends the contents of FIFO $FC_1$, namely the address of command descriptor $COM_1$ plus the corresponding channel number $C_1$, to FIFO FREP of $MV_1$ In parallel, the task sends the send status of the frame to command descriptor $COM_1$ contained in $MV_1$. Indeed, in the command descriptor there is a location provided for the purpose, and this location is empty at the beginning, namely at the time the CNS program is preparing $COM_1$ (see phase $PH_1$).

Once this is done, task $TC_1$ sends to first processor $MP_1$ a signal indicating that transmission of frame $TR_1$ is complete, this signal being called CPUREQ and being sent at time $t_{n+1}$. Phase $PH_7$ then ensues.

Phase $PH_7$

Task $TC_1$ then looks in $FC_1$ to see whether there is an address of another command descriptor and the corresponding channel number. If there is, phase $PH_1$ ensues for sending another frame, $TR_2$ for example. If there is not, operation $OP_3$ ensues, i.e. task $TC_1$ is placed in the event waiting position.

It is clear that the other tasks $TC_2$ to $TC_6$ can operate in parallel with task $TC_1$.

We will now consider event $EV_1$ and assume that controller CCS receives a frame $TR_{11}$, containing 10 buffers $BF_{11}$ to $BF_{20}$, from network $RE_1$-$RE_2$. We will also assume that microprocessor $MP_1$, on instruction from the CNS program, allows activation of channel $C_1$ in the receive mode. Reception of frame $TR_{11}$ proceeds according to the following successive phases:

Phase $PH_{11}$ (starting at time $T_0$)

The task corresponding to channel $C_1$, namely $TC_1$, has just assigned itself a free location in memory $MV_1$ for a command descriptor, then a free location for a buffer descriptor, and places in the command descriptor occupying this free location, which is designated $COM_{11}$, the address of the physical location occupied by the first buffer descriptor, designated $DB_{11}$, then assigns itself a total of eight buffer descriptors, namely $DB_{11}$ (already named) to $DB_{18}$. Task $TC_1$ chains these buffer descriptors together in the same way as $DB_1$, $DB_2$, etc. were chained together. Task $TC_1$ also assigns itself eight buffers, each corresponding to the buffer descriptor, namely $BF_{11}$ to $BF_{18}$. It will then place the addresses of each of buffers $BF_{11}$ to $BF_{18}$ in the eight buffer descriptors $DBC_{11}$ to $DBC_{18}$ of $SCC_1$, with an interrupt request $DITDMA_1$ (time $T_1$) when the address of buffer $BF_{16}$ is written in buffer descriptor $DBC_6$. When the buffer addresses are written in all the buffer descriptors of $SCC_1$, task $TC_1$ indicates to $SCC_1$ by interrupt PR (time $T_2$) that it is ready to receive frame $TR_{11}$. The next phase $PH_{12}$ then ensues.

Phase $pH_{12}$

The information received from network $RE_1$-$RE_2$ is transferred directly to the physical locations of buffers $BF_{11}$ to $BF_{18}$ as long as there are no end-of-frame interrupts sent by the terminal sending over the network, said end-of-frame interrupt being decoded by $SCC_1$. When sixth buffer $BF_{16}$ corresponding to buffer descriptor $DBC_6$ has been filled, an interrupt $ITDMA_1$ is sent (time $T_3$). Buffer descriptors $DBC_{11}$ to $DBC_{16}$ are then reinitialized, and made to correspond to six new physical empty-buffer locations $BF_{19}$ to $BF_{24}$ in $MV_1$.

Phase $PH_{13}$ then ensues.

Phase $PH_{13}$

During reception of the tenth buffer ($BF_{20}$), end-of-frame interrupt ITFTR occurs (time Tn). Task $TC_1$ places in command descriptor $COM_{11}$ the status of the frame received, i.e. indicates whether this frame was correctly received and whether or not it contains errors, as well as the total number of bytes it contains. The next phase $PH_{14}$ then ensues.

Phase $PH_{14}$

Task $TC_1$ places in FIFO FREC of first memory $MV_1$ the address of command descriptor $COM_{11}$ as well as the number of the channel corresponding to this descriptor, i.e., 1. Phase $PH_{15}$ then ensues.

Phase $PH_{15}$

Task $TC_1$ releases the buffer descriptors of serial communications controller SCC which are unused ($BF_{21}$ to $BF_{24}$) and which had been prepared following interrupt $ITDMA_1$. As soon as they are released, processor $MP_2$ sends an interrupt CPUREQ to the first processor at time $T_{n+1}$, which signifies that the entire frame $TR_{11}$ has been transferred to the $MV_1$ buffers. Frame $TR_{11}$ is then at the disposal of the CNS program.

Other modifications and implementations will occur to those skilled in the art without departing from the spirit and the scope of the invention as claimed. Accordingly, the above description is not intended to limit the invention except as indicated in the following claims.

What is claimed is:

1. A communications controller (CCS) for connection between a bus (PSB) associated with at least one host system (HOST) and a plurality of terminals of at least one network ($RE_1$-$RE_2$) which are connected together through at least one time-multiplexed digital link ($S_0$) that includes a plurality of data channels ($C_1$ to $C_6$) for transferring frames, the data channels being managed according to specific protocols and being supported by at least one transmission line ($LE_1$-$LR_1$, $LE_2$-$LR_2$), said communications controller comprising:

a base unit (BA), connected to said bus (PSB), for managing and effecting the transfer of frames ($TR_1$ to $TR_2$ . . . ) over each one of said plurality of data channels ($C_1$ to $C_6$); and a peripheral unit (PER) connected both to said base unit (BA) and to said transmission line, for ensuring time-multiplexing and demultiplexing of various data channels of the link, and for transmitting data to the network and receiving data from the network, wherein said base unit (BA) includes:

a first memory ($MV_1$) for storing frames before they are transferred, and for managing transfer of the frames to various channels assigned thereto;

a first control processor ($MP_1$), for transferring frames from the host to the network ($RE_1$-$RE_2$) and vice versa, connected to the bus and associated with said first memory ($MV_1$), said first control processor (MP$_1$) executing a communications program (CNS) which is written in said first memory (MV$_1$) when the communications controller (CCS) is initialized;

a second processor (MP$_2$), communicating with the first control processor (MP$_1$), for transferring each of frames (TR$_1$, TR$_{11}$), channel by channel, from said first memory (MV$_1$) to the peripheral unit and then to the network, and vice versa; and a second memory (MV$_2$) associated with said second processor (MP$_2$), said second processor (MP$_2$) executing a microprogram architecture (AML) which is written into said second memory (MV$_2$) at the time the controller is initialized, said microprogram architecture (AML) having a nucleus (NY), a communications interface (IC) for dialogues between the communications program (CNS) and the microprogram architecture (AML), and at least as many microprogram modules (TC$_0$, TC$_1$, . . ., TC$_7$) as there are channels.

each channel being associated with a microprogram module which transfers frame assigned to this channel from the first memory (MV$_1$), to the network via the peripheral part, and vice versa, each microprogram module being independent of other microprogram modules, its sequencing being organized in real-time by the nucleus (NY), and wherein said peripheral part (PER) includes:

a coupler (CO, CO$_1$-CO$_2$) for all the channels, controlled by said second processor (MP$_2$) and connected to the transmission line, coming from or going to said first memory (MV$_1$), and for providing multiplexing or demultiplexing of the data upon sending or upon receiving.

2. The communications controller of claim 1 wherein, upon sending, said first processor (MP$_1$) receives the frames from said bus, divides each frame into a plurality of buffers (BF$_1$. . .B$_n$) which are stored randomly in the first memory and at a plurality of different physical locations, the second processor than transferring the plurality of buffers to said network (RE$_1$-RE$_2$).

3. The communications controller of claim 1 wherein, in receive mode, first processor (MP$_1$) receives from the network, via coupler (CO, CO$_1$-CO$_2$), the frame which it stores randomly in first memory (MV$_1$) before sending them via said bus (PSB) to said host system (HOST).

4. The communications controller of claim 1 wherein said communications interface (IC) communicates with nucleus (NY) and with said communications program (CNS), handles the requests coming from said communications program (CNS), and switches them, via said nucleus (NY), to the microprogram modules (TC$_0$ to TC$_7$) corresponding to the various channels for execution.

5. The communications controller of claim 4 wherein said communications interface (IC), via said nucleus (NY), effects transfers of status or data coming from channels (C$_1$ to C$_6$) corresponding to each of the microprogram modules to said communications program (CNS).

6. The communications controller of claim 1 wherein the exchange between said base unit (BA) and said peripheral unit (PER) are defined by command descriptors (COM$_1$, COM$_2$, COM$_3$, . . . ), each corresponding to a given frame and defining the operations that are to be accomplished on this frame, and are stored randomly in the first memory.

7. The communications controller of claim 6 wherein the command descriptors corresponding to frame assigned to a given channel are connected by chaining pointers (PC$_1$, PC$_2$, . . . ), the chaining pointer of each descriptor indicating a logic address of the next descriptor.

8. The communications controller of claim 7 wherein each command descriptor (COM$_1$, COM$_2$) points to a buffer descriptor (DB$_1$, DB$_2$) that defines characteristics of a first buffer (BF$_1$) of the frame associated with command descriptor (COM$_1$), each of the buffers of one frame being associated with one buffer descriptor, the buffer descriptors being chained together by buffer pointers (PCB$_1$, PCB$_2$, . . . ) each buffer pointer defining the logic address of the buffer descriptor chained to the buffer descriptor that contains this same pointer, each of the buffer descriptors pointing to the corresponding buffer by a buffer pointer defining the logic address of this buffer in first memory (MV$_1$), the physical locations of the buffer descriptors and the buffers being defined randomly by the first processor.

9. The communications controller of claim 6 wherein coupler (C$_0$) has a plurality of serial communications controllers operative to multiplex, demultiplex, serialize, and deserialize data, each serial controller being associated with at least one channel and having buffer descriptors (DBC$_1$ to DBC$_8$) each corresponding to a buffer descriptor in first memory (DB$_1$ to DB$_n$) and indicating the address of the buffer descriptor in first memory and a number of bytes contained in the buffer descriptor in first memory.

10. The communications controller of claim 6 wherein first memory (MV$_1$) has a first FIFO memory zone (FG) containing elements (e$_1$-e$_p$), each element containing the address of one command descriptor (COM$_1$, COM$_2$) and channel number (C$_1$ to C$_6$) assigned to the frame associated with this command descriptor, the second memory (MV$_2$) having FIFO memory zones each associated with a given data channel, each containing the addresses of all the command descriptors corresponding to the frames assigned to the channel associated with them as well as the number of this channel.

* * * * *

UNITED STATES PATENT AND TRADEMARK OFFICE
CERTIFICATE OF CORRECTION

PATENT NO. : 5,210,747
DATED : May 11, 1993
INVENTOR(S) : Bernard Gauthier, et al It is certified that error appears in the above-identified patent and that said Letters Patent is hereby corrected as shown below:

Column 3, line 4, "conneoted" should read --connected--.

Column 4, line 40, "B and $B_2$" should read --$B_1$ and $B_2$--.

Column 5, line 47, "$RE_1$ or $RE_z$" should read --$RE_1$ or $RE_2$--.

Column 6, line 60, "aIone" should read --alone--.

Column 6, line 61, "$BCC_2$" should read --$SCC_2$--.

Column 7, line 26, "COM1" should read --$COM_1$--.

Column 7, line 46, "frame $TR_1$" should read --frame $TR_{11}$--.

Column 8, line 7, "DB1" should read --$DB_1$--

Column 10, line 5, "$TC_1$ to TC" should read --$TC_1$ to $TC_6$--.

Column 10, line 26, "EV1" should read --$EV_1$--.

Column 10, line 27, "$EV_e$ or EV1" should read --$EV_o$ or $EV_1$--.

Column 11, line 45, "DB1e" should read --$DB_{10}$--.

UNITED STATES PATENT AND TRADEMARK OFFICE
CERTIFICATE OF CORRECTION

PATENT NO. : 5,210,747
DATED : May 11, 1993
INVENTOR(S) : Bernard Gauthier, et al It is certified that error appears in the above-identified patent and that said Letters Patent is hereby corrected as shown below:

Column 13, line 12, "$MV_1$" should read --$MV_1.$--.

Column 13, line 59, "Written" should read --written--.

Column 14, line 26, "SCC" should read --$SCC_1$--.

Column 15, line 24, "frame" should read --frames--.

Column 15, line 47, "frame" should read --frames--.

Column 16, line 15, "frame" should read --frames--.

Column 16, line 22, "$(DB_1, DB_2)$" should read --$(DB_1, DB_n)$--.

Signed and Sealed this

Fourteenth Day of June, 1994

Attest:

BRUCE LEHMAN

*Attesting Officer*  *Commissioner of Patents and Trademarks*